Oct. 9, 1962 V. R. WEIL 3,057,070
SHOE SIZE MEASURING DEVICE
Filed Dec. 28, 1959 2 Sheets-Sheet 1

INVENTOR
VERNE R. WEIL

BY Robinson & Berry
ATTORNEY

Oct. 9, 1962 V. R. WEIL 3,057,070
SHOE SIZE MEASURING DEVICE

Filed Dec. 28, 1959 2 Sheets-Sheet 2

INVENTOR
VERNE R. WEIL
BY Robinson & Berry
ATTORNEY

This invention relates to improvements in foot measuring and shoe size indicating means. More specifically stated, it resides in the provision of a foot measuring device, embodying an arrangement of parts that is in many ways similar to that of a typical "bath room" weighing scale, including a yieldable platform, on which a person may stand to obtain a foot length measurement, and which platform will, by its yielding under the weight of the person standing thereon, actuate foot contacting members and indicators whereby to visually indicate the proper shoe size for that particular person.

It is the principal object of the present invention to provide a shoe size indicating means of the above stated kind that is novel, practical, economical and especially desirable for use in "self service" shoe stores.

It is a further object of the present invention to provide a mechanism of the above kind which permits a customer in a self service store to determine for himself, without the help of a clerk or salesman, his proper shoe size in a quick and easy way.

A still further object of the present invention resides in the provision of a shoe size indicating mechanism of the character above recited, wherein slidably mounted stops are caused to move, under weight of a customer upon his stepping properly onto the yieldably supported measuring platform, from retracted positions to toe contacting position and which stops, by such movement, will cause the actuation of properly calibrated shoe size indicating dials in accordance with the extent of movement of said stops. Furthermore, to provide a yieldable section or link in the operating connection between platform and each movable stop whereby in case the stop should engage with the customer's toe, as required for a correct measurement, before the weight of the user has been restrained by the platform supports, no detrimental strain will be placed on the stop actuating means or will this result in an inaccurate measurement or indication of shoe size.

Still further objects and advantages of the present invention reside in the details of construction of parts; in their assembly and combination and in the mode of operation of the mechanism, as will hereinafter be fully described.

In accomplishing the above mentioned and other objects of the invention, I have provided the improved details of construction, the preferred forms of which are illustrated in the accompanying drawings, wherein.

Figure 1:
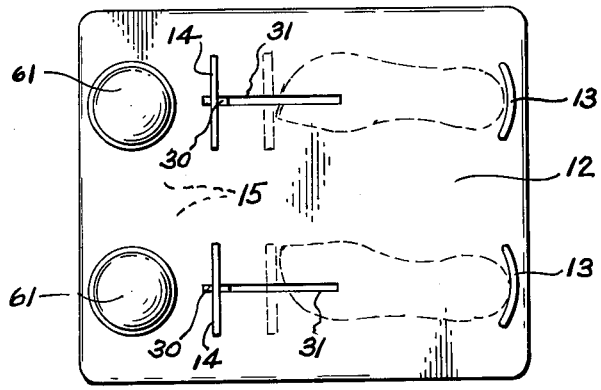
FIG. 1 is a top, or plan view, of a foot measuring or shoe size indicating mechanism embodied by the present invention.

Referring more in detail to the drawings:

The foot measuring and shoe size indicating device of the present invention, as shown in FIG. 1, is similar to a typical, present day bath room scale. It is herein shown to comprise a rectangular base structure, designated in its entirety by reference numeral 10, preferably of metal and adapted to rest flatly upon a horizontal floor surface. Supported horizontally upon this base structure 10 through the mediacy of coiled springs 11, at its four corners, is a platform 12 on which the customer or user of the device stands, as on a weighing scale, in obtaining a foot measurement and shoe size indication.

At its heel end, herein designated as the "rearward end," the platform 12 is equipped on its top surface, with two laterally spaced heel stop flanges 13—13 against which the user of the device places his heels, with feet directed forwardly, as in FIG. 1, preparatory to obtaining his shoe size measurement when standing on the platform.

Slidably mounted along the top surface of the platform, and extending transversely thereof, are paired but independently movable toe contacting bars 14—14 which, under weight of the user, as sustained by the platform, are caused, by means presently described, to be drawn rearwardly into contact with the outer ends of the great toes of the user's feet, as he stands for measurement on the platform. By their movement, each of these toe contacting bars 14 is caused to rotatably actuate a graduated dial 15 that will visually indicate to the user, the shoe size required for the corresponding foot.

The arrangement of parts, as so far described, is such that when the user or customer steps from the platform 12, the stop bars 14—14 are caused to be returned by means presently disclosed, to their original or retracted positions, as shown in full lines in FIG. 1, in readiness for the next user of the device.

Figure 2:
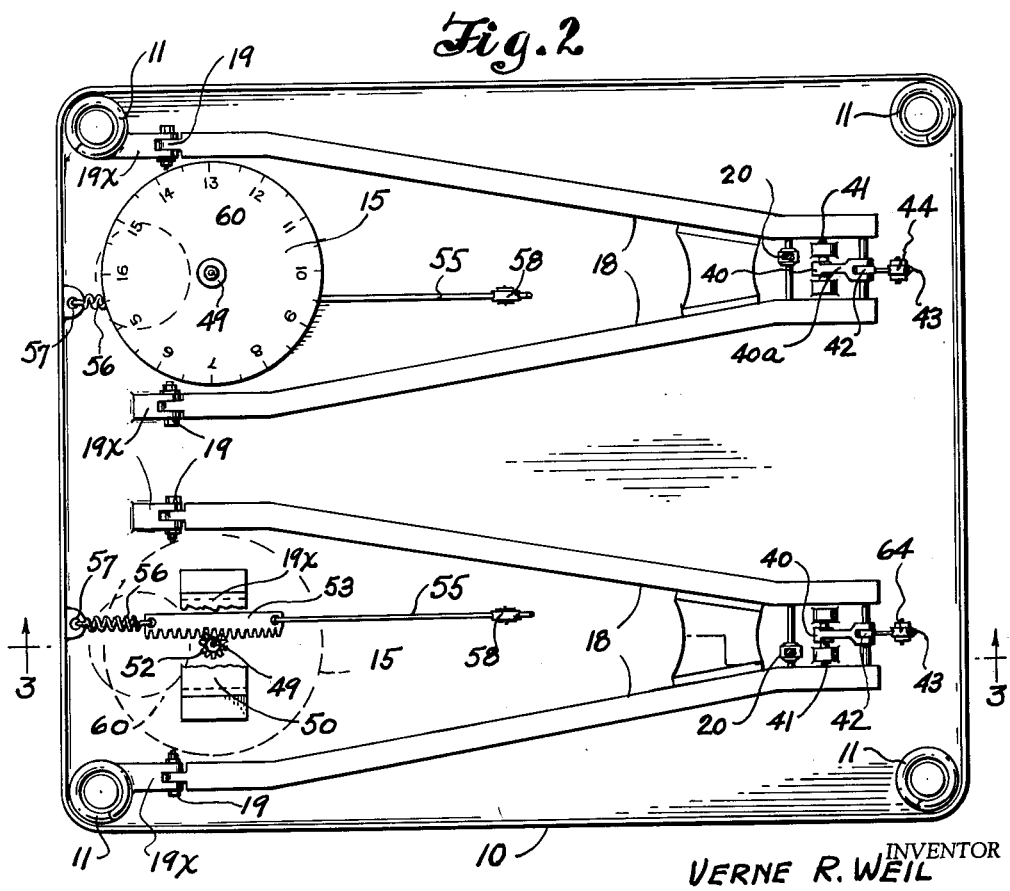
FIG. 2 is an enlarged plan view of the mechanism with the platform and one of the size indicating dials removed from the base portion thereof.
Figure 3:
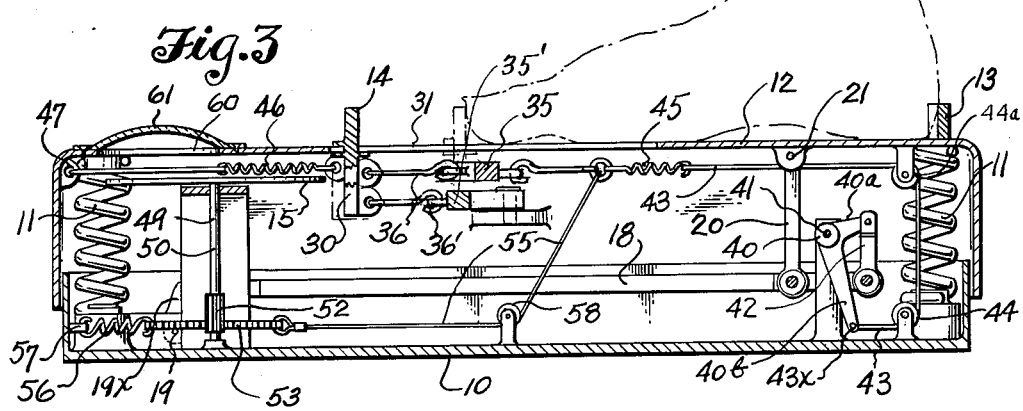
FIG. 3 is a longitudinal section, taken in a vertical plane substantially on line 3—3 in FIG. 2, showing one of the dial actuating mechanisms.

Extended lengthwise of and upon the base structure, as best shown in FIGS. 2 and 3, are paired levers 18—18, located beneath the platform and normally supported substantially in the same horizontal plane in parallel relationship; each being pivotally supported at its forward end as at 19, in FIG. 2, from supports 19x that are fixed on the base 10, for limited vertical swinging movement at their rear ends. They also are individually connected for actuation, each by a link 20 pivotally connected to the underside of the platform, as at 21 in FIG. 3, these link connections with the levers being relatively close to the swinging ends of the levers, as noted in FIG. 3. Through their link connections with the platform 12 the levers 18—18 are caused, incident to a person stepping onto the platform 12, to be actuated downwardly. Tension in the platform supporting springs 11 is predetermined to maintain yielding resistance at each corner of the platform and give the platform suitable stability.

Each of the toe contacting bars 14 as mounted on the platform is equipped at its under edge, medially of its ends with a guide and adjusting leg 30. These legs extend downwardly therefrom through slots 31—31 formed through and lengthwise of the platform, as best shown in FIG. 1.

Figure 4:
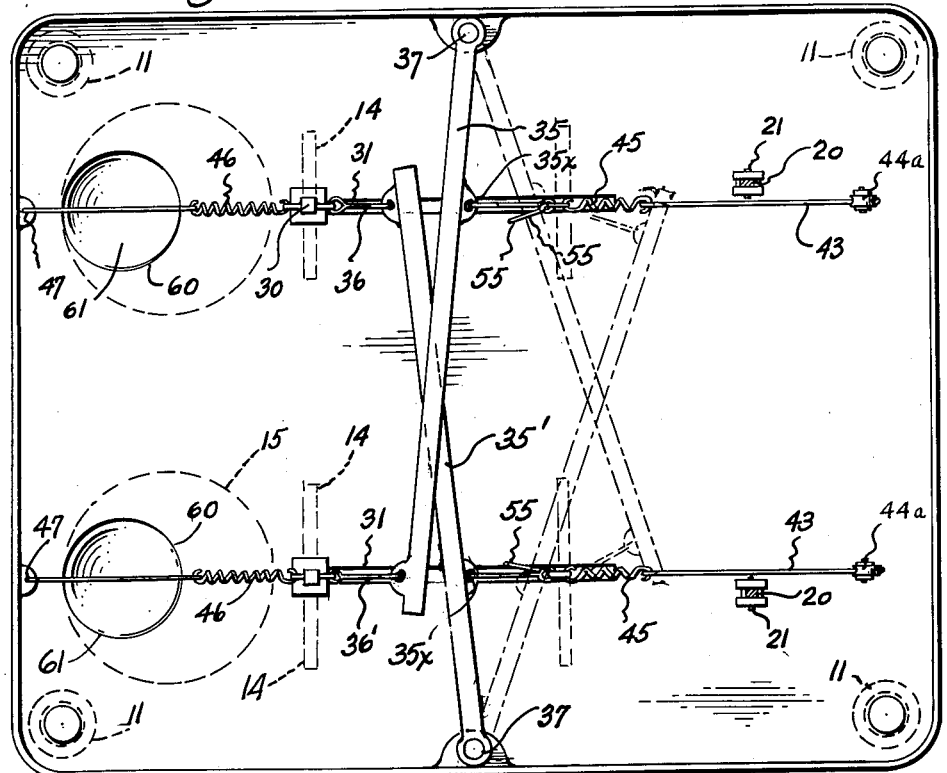
FIG. 4 is an underside, plan view of the platform on which the customer stands in obtaining a foot measurement and shoe size indication.

Extending horizontally and transversely of the platform, at its under side and from opposite sides thereof, respectively, as shown in FIG. 4, are paired lever arms 35—35'; each of which, at its outer end, is pivotally mounted on the platform as at 37 for horizontal swinging. These levers have short cable connections 36—36' at their swinging ends as shown in FIG. 4 with the lower end of the guide legs 30—30 of the stop bars 14—14, as has been shown in FIG. 3.

It is also shown in FIGS. 2 and 3, that a bell crank lever 40 is pivotally mounted on the base 10 within the forward end portion of each of the levers 18—18, as at 41, to swing in the vertical longitudinal planes of the levers 18. Each bell crank lever 40 has a relatively short horizontal lever arm 40a pivotally connected by a short downwardly directed link 42 with the swinging end of the corresponding lever 18 and has a relatively long, downwardly extending lever arm 40b to which one end of a cable 43 is fixed; as at 43x. This cable extends rearwardly, passing about a sheave wheel 44 at the inner end of the base, thence upwardly and over a sheave 44a on the under side of the platform and thence forwardly and is connected to the corresponding lever arm 35—35' relatively close to its pivoted end, as at 35x in FIG. 4. Thus, when the swinging ends of the levers 18—18 are moved downwardly under weight of a customer stepping onto the plaftorm, the levers 35—35' will be swung rearwardly, for example, as shown in dot-dash lines in FIG. 4, and the connecting links 36—36' will cause the stop bars 14—14 to be moved rearwardly until they contact with the customer's toes as in dotted lines in FIG. 1. This stops their rearward movement. If there is any further downward movement of the lever arms 18—18 under the weight of the user, this is relieved by the stretching of coil springs 45 that are interposed in the cable connections 43, as shown in FIG. 3.

When the customer steps from the platform, it is returned to lifted position by the supporting spring 11 and this relieves tension in the stop actuating cables 43 and the levers 18—18 are allowed to return to normal positions. The stop bars 14—14 also are returned to their forward positions by coiled spring connections, 46—46, extended forwardly from the legs 30—30 and connected to the front end of the platform, as at 47 in FIG. 3. The springs 46—46 slightly over power the tension of springs 45—45.

Mounted in the forward end portion of the base structure 10, in alignment with the guide slots 31—31 are the previously mentioned graduated dials 15—15. These are rotatably supported by vertical axles 49—49' each mounted in a frame member 50 that is fixed to the base. Each has a small gear 52 fixed thereto and a toothed rack bar 53 is supported in operative mesh with each gear 52; each rack bar being horizontally disposed and held in operative mesh with the corresponding gear by a taut cable connection 55 at one end and a coiled spring 56 at its other end. The springs 56 are attached under tension to the base frame as at 57 and the cables 55 are passed rearwardly under sheaves 58 and are then connected under tension to the corresponding cable 43 forwardly of the spring 45, but rearwardly of the levers 35 and 35' to which the cable is connected. Through these connections the dials will be rotated in accordance with the foot measuring movements of the stop bars 14—14.

Assuming that the device has been constructed as described, its use in a shoe store is as follows: To determine the proper shoe size, the customer removes his shoes, steps onto the platform 12 and places the heels of his two feet against the heel flanges 13—13 with feet pointed directly forward. The weight of the customer depresses the spring supported platform 12 and thus effects a downward actuation of levers 18—18 and an incident rearward swinging of the two lever arms 35—35'. This movement of the lever arms, through the cable 43—43 connections, effects a rearward movement of the stop bars 14—14 along slots 31—31 to the limited extent as established by their engagement with the toes of the customer. The pull on the cables 43 is transmitted also through the cable connections 55 to the rack bars 53 to rotate the shoe size indicating dials 15—15 to show, by reference to graduations on their top faces and their relationship to a fixed point or line, the size of shoe required. It is to be understood that the bars 14—14 are independently movable and therefore if the feet are of different length, the size for each foot will be indicated, respectively, by the two dials; the graduated portions of the dials are visible to the user of the apparatus through openings, as at 60, in the platform and if it is desired magnifying lenses 61 may be applied over these openings.

In the making of a mechanism of the present kind, it is recognized that additions, refinements and modifications might be made without departing from the spirit of the invention. It is believed however, that novelty resides in the provision of a platform that yields downwardly under the weight of a person stepping onto it, and this yielding movement operates to move members such as the stop bars 14—14 against the user's toes to give an indication of shoe size. The indication may be made visible to the user by reference to a graduated scale which is caused to move relative to a fixed point or vice versa.

Novelty also is believed to reside in the yielding connections between the platform 12 and the levers 35—35 which actuate the stop bars.

While the foregoing description of the mechanism and its mode of operation has been directed to foot length measurements only, it is readily apparent that similar movable stop mechanisms may be employed to ascertain width of foot measurements and it is the intent that this specification shall apply equally to such means. In such case, the position of the feet would be definitely established by stops engaged with one side thereof and movable stops would be caused to move, under the weight of the customer, against the opposite sides of the feet to actuate calibrated dials or slides to show foot width.

What I claim as new is:

1. In a foot measuring mechanism of the character described: a base, a platform yieldingly mounted on said base and upon which a person may stand to cause a downward yielding movement of the platform in effecting a foot measuring operation, a heel stop fixed on the platform for establishing the position of the foot of said person for measurement, a toe contacting bar movably supported on the platform for movement from a retracted position forwardly of the great toe of the foot as positioned for measurement, toward and into touching contact with the end of the toe, a calibrated member movable with the toe contacting bar in accordance with the extent of its movement to toe contacting position to designate shoe size and means operable by the downward yielding movement of the platform under the weight of the person standing thereon to actuate the toe contacting bar from the retracted to the toe contacting position; said means including a spring of light tension that permits continued downward travel of the platform to satisfy the full weight of the user after the toe contacting bar has been stopped by its engagement with the toe.

2. In a foot measuring and shoe size indicating mechanism of the character described; a base, a platform yieldably supported on said base for downward movement under the weight of a person stepping onto it to obtain a foot measurement, a heel positioning flange applied to the platform, a toe contacting bar slidably movable on the platform for actuation from a normally retracted position toward and into contact with the great toe of the positioned foot of the person standing on the platform for a foot measurement, a graduated foot size indicator mounted on the base, and means including a weak spring connection operable by downward yielding of the platform under weight of a person stepping onto it, to move the toe contacting bar into touching engagement with the great toe of the foot being measured, and to move the graduated shoe size indicator in accordance with the travel of the corresponding toe contacting bar; and springs of greater strength than that first mentioned for return of the toe contacting bar and size indicator to normal position with return of the platform to raised position.

References Cited in the file of this patent

UNITED STATES PATENTS

| | | |
|---|---|---|
| 2,165,017 | Sisson | July 4, 1939 |
| 2,330,317 | Stewart | Sept. 28, 1943 |
| 2,331,117 | Del Pesco | Oct. 5, 1943 |
| 2,339,031 | Rosenberg | Jan. 11, 1944 |
| 2,566,356 | Niper | Sept. 4, 1951 |
| 2,618,066 | Bowen | Nov. 18, 1952 |
| 2,706,856 | Cwiak | Apr. 26, 1955 |